(12) United States Patent
Oda

(10) Patent No.: US 9,100,515 B2
(45) Date of Patent: Aug. 4, 2015

(54) IMAGE FORMING APPARATUS CAPABLE OF ASSIGNMENT TO PRINT DESTINATION

(71) Applicant: KYOCERA DOCUMENT SOLUTIONS INC., Osaka (JP)

(72) Inventor: Kota Oda, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/285,661

(22) Filed: May 23, 2014

(65) Prior Publication Data

US 2014/0355022 A1   Dec. 4, 2014

(30) Foreign Application Priority Data

May 31, 2013   (JP) ................ 2013-116121

(51) Int. Cl.
*G06F 3/12*       (2006.01)
*H04N 1/00*       (2006.01)
*G06K 1/00*       (2006.01)

(52) U.S. Cl.
CPC ............ *H04N 1/00214* (2013.01); *G06F 3/126* (2013.01); *G06F 3/1221* (2013.01); *G06F 3/1285* (2013.01); *G06F 3/1291* (2013.01); *H04N 1/00278* (2013.01)

(58) Field of Classification Search
CPC ..... G06F 3/1204; G06F 3/1285; G06F 3/124; G06F 3/1277; G06F 3/1213; G06F 3/1221; G06F 3/126; G06F 3/1291; H04N 1/00204; H04N 2201/0032; H04N 1/00278
USPC ............. 358/1.1, 1.12, 1.13, 1.14, 1.15, 1.18, 358/402; 709/201, 203, 227, 229, 231
See application file for complete search history.

(56) References Cited

U.S. PATENT DOCUMENTS

| | | | |
|---|---|---|---|
| 6,771,386 B1 * | 8/2004 | Kato ............................ | 358/1.15 |
| 8,749,829 B2 * | 6/2014 | Teshima ....................... | 358/1.15 |
| 2008/0117453 A1 * | 5/2008 | Toda ............................ | 358/1.15 |
| 2011/0002009 A1 * | 1/2011 | Ohashi ........................ | 358/1.15 |

FOREIGN PATENT DOCUMENTS

JP   2012-063908 A   3/2012

* cited by examiner

*Primary Examiner* — Gabriel Garcia
(74) *Attorney, Agent, or Firm* — Studebaker & Brackett PC

(57) ABSTRACT

An image forming apparatus is connected to an information processing device and at least one external image forming apparatus through a communication circuit. The image forming apparatus includes a communication section, an image forming section, an image processing section, and an assignment control section. The image processing section performs image processing on print data received from the information processing device. The assignment control section determines a print destination for processed print data subjected to image processing by the image processing section from the image forming apparatus of its own and the at least one external image forming apparatus.

8 Claims, 4 Drawing Sheets

IMAGE FORMING APPARATUS CAPABLE OF ASSIGNMENT TO PRINT DESTINATION

INCORPORATION BY REFERENCE

The present application claims priority under 35 U.S.C. §119 to Japanese Patent Application No. 2013-116121, filed May 31, 2013. The contents of this application are incorporated herein by reference in their entirety.

BACKGROUND

The present disclosure relates to image forming apparatuses and image forming systems including an image forming apparatus.

For image forming systems in which a plurality of image forming apparatuses and a plurality of information processing devices are connected together through a network, configurations have been examined in which a job administering device collectively administers print data received from one of the information processing device. Image forming systems of some type include a job administering device that distributes print data to the image forming apparatuses for printing as necessary. Such an image forming system can reduce wait time until printing is completed, while saving power consumption.

Each image forming apparatus in image forming systems of some type includes an image processing section (e.g., an ASIC) for image processing. Upon request of image processing from a user, the respective image forming apparatuses perform the image processing on print data.

SUMMARY

An image forming apparatus according to the present disclosure is connected to an information processing device and at least one external image forming apparatus through a communication circuit. The image forming apparatus includes a communication section, an image forming section, an image processing section, and an assignment control section. The communication section is configured to transmit/receive information to/from the information processing device and the at least one external image forming apparatus through the communication circuit. The image forming section is configured to form an image on a recording medium. The image processing section is configured to perform image processing on print data received from the information processing device. The assignment control section is configured to determine a print destination for processed print data subjected to image processing by the image processing section from the image forming apparatus of its own and the at least one external image forming apparatus.

An image forming apparatus according to the present disclosure is connected to an information processing device and an external image forming apparatus through a communication circuit. The image forming apparatus includes a communication section and an image forming section. The communication section is configured to transmit/receive information to/from the information processing device and the external image forming apparatus through the communication circuit. The image forming section is configured to form an image on a recording medium. The image forming section forms an image on the basis of processed print data received form the external image forming apparatus.

An image forming system according to the present disclosure includes a plurality of image forming apparatuses including a master image forming apparatus and a slave image forming apparatus and a plurality of information processing devices connected to the a plurality of image forming apparatuses through a communication circuit. The master image forming apparatus includes a communication section, an image forming section, an image processing section, and an assignment control section. The communication section is configured to transmit/receive information to/from the slave image forming apparatus and the information processing devices through the communication circuit. The image forming section is configured to form an image on a recording medium. The image processing section is configured to perform image processing on print data received from the information processing devices. The assignment control section is configured to determine a print destination for processed print data subjected to image processing by the image processing section from the master image forming apparatus and the slave image forming apparatus.

DETAILED DESCRIPTION

With reference to the accompanying drawings, description will be made below about embodiments of an image forming apparatus and an image forming system including image forming apparatuses according to the present disclosure. It should be noted that the present disclosure is not limited to the following embodiments.

Figure 1:
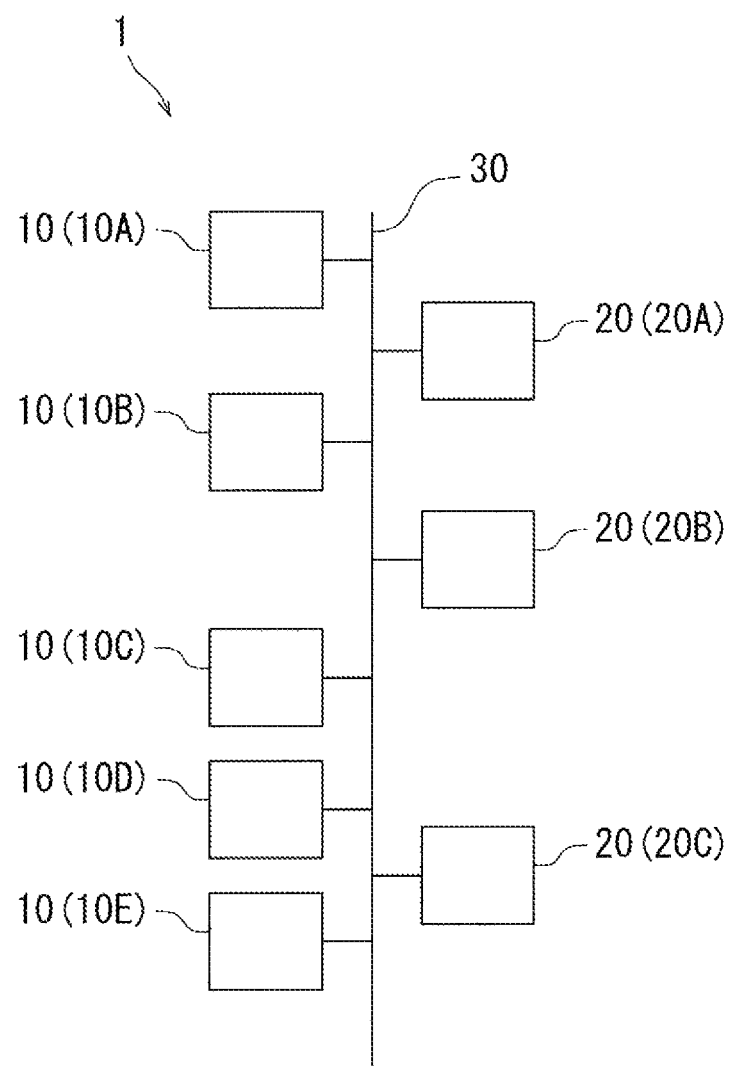
FIG. 1 is a schematic illustration showing a configuration of an image forming system according to one embodiment of the present disclosure.

FIG. 1 is a schematic illustration showing a configuration of an image forming system 1 according to one embodiment of the present disclosure. The image forming system 1 includes a plurality of information processing devices 10 and a plurality of image forming apparatuses 20. The information processing devices 10 and the image forming apparatuses 20 are connected together through a communication circuit 30. In the image forming system 1, any one of the image forming apparatuses 20 functions as a master image forming apparatus, while each of the other image forming apparatus(es) functions as a slave image forming apparatus. The master image forming apparatus outputs an instruction to each slave image forming apparatus. Each slave image forming apparatus executes a function corresponding to the instruction received from the master image forming apparatus. The image forming system 1 will be described below which includes five information processing devices 10 (hereinafter they may be referred to as information processing devices 10A-10E for identification) and three image forming apparatus 20 (hereinafter they may be referred to as image forming apparatuses 20A-20C for identification), for example.

Figure 2:
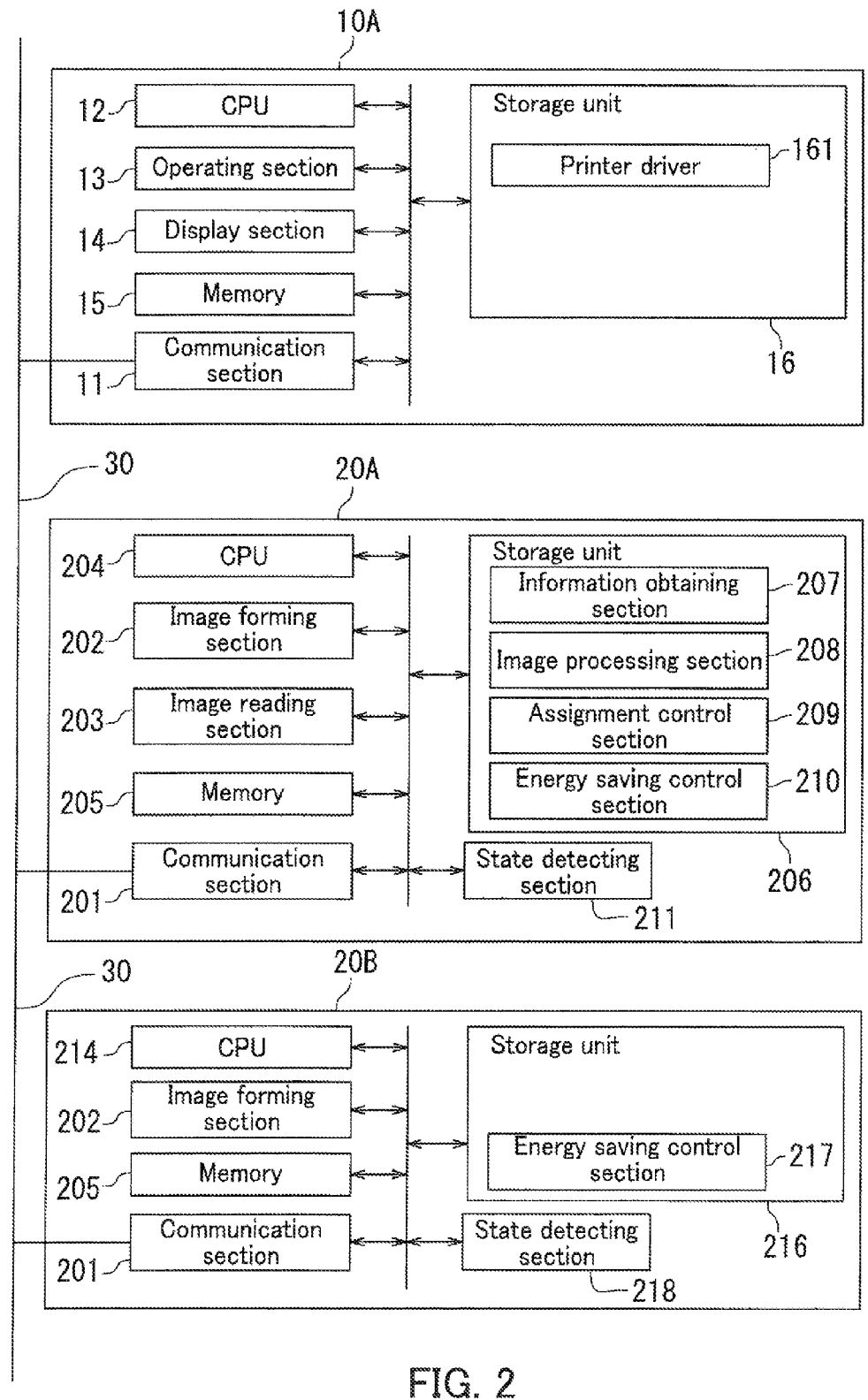
FIG. 2 is a block diagram showing a configuration of an information processing device and image forming apparatuses according to one embodiment of the present disclosure.

The information processing devices 10 transmit print data to the image forming apparatuses 20 according to user's operation. FIG. 2 is a block diagram showing each configuration of the information processing device 10A and the image forming apparatuses 20A and 20B. The information processing device 10A will be described below first with reference to FIG. 2. It is noted that the information processing devices 10B-10E have the same configuration as the information processing device 10A unless otherwise specified. In the present embodiment, the information processing device 10A is a personal computer (PC). The information processing device 10A includes a communication section 11, a CPU 12, an operating section 13, a display section 14, a memory 15, and a storage unit 16.

The communication section 11 is an interface to transmit/receive information to/from an external device through a communication circuit 30. In one example, the information processing device 10A transmits information to the information processing devices 10B-10E and the image forming apparatuses 20A-20C through the communication section 11. Further, the information processing device 10A receives information from the information processing devices 10B-10E and the image forming apparatuses 20A-20C through the communication section 11.

The CPU 12 performs preset processing by executing a preset program stored in the memory 15 or the storage unit 16.

The operating section 13 is an input device, such as a keyboard, a mouse, a touch panel, or the like. The operating section 13 is used for operating the information processing device 10A. The user operates the information processing device 10A through the operating section 13 for transmission of print data to the image forming apparatus 20.

The display section 14 is a device, such as a liquid crystal display device or the like. The display section 14 displays various types of information, such as print data, a use state of each image forming apparatus 20, etc.

The memory 15 is a storage device including a read only memory (ROM) and a random access memory (RAM). The memory 15 stores a program for controlling the information processing device 10A. The CPU 12 controls the entire information processing device 10A by executing a program stored in the memory 15.

The storage unit 16 is a storage device, such as a hard disk or the like. The storage unit 16 stores a printer driver 161. The printer driver 161 is a program for allowing any image forming apparatuses 20 to execute its function. When the user inputs a print request through the operating section 13, the CPU 12 executes the printer driver 161. When the CPU 12 executes the printer driver 161, the display section 14 displays a predetermined screen for setting of print conditions. The user sets various types of conditions as necessary. The printer driver 161 transmits print data generated on the basis of the print conditions set by the user to the master image forming apparatus of the image forming apparatuses 20A-20C. It is noted that the print conditions may include print destinations, output modes (e.g., energy saving priority mode, closest apparatus priority mode, and print speed priority mode), the number of copies to be printed, the size and types of paper, margins, etc.

The respective image forming apparatuses 20 can print print data received from any image forming apparatuses 10. In the present embodiment, the image forming apparatus 20A serves as the master image forming apparatus, while the image forming apparatuses 20B and 20C serve as the slave image forming apparatuses. The image forming apparatus 20A will be described below with reference to FIG. 2. The master image forming apparatus 20A is a multifunction peripheral. The master image forming apparatus 20A includes a communication section 201, an image forming section 202, an image reading section 203, a CPU 204, a memory 205, a storage unit 206, and a state detecting section 211.

The communication section 201 is an interface to transmit/receive information to/from an external device through the communication circuit 30. In one example, the master image forming apparatus 20A transmits information to the information processing devices 10A-10E and the slave image forming apparatuses 20B and 20C through the communication section 201. Further, the master image forming apparatus 20A receives information from the information processing devices 10A-10E and the slave image forming apparatuses 20B and 20C through the communication section 201.

The image forming section 202 forms an image on a recording medium. Any known configuration is employable in the image forming section 202. Therefore, detailed description and illustration thereof are omitted. In one example, the image forming section 202 may include a conveyance section, a photoreceptor, a development section, a transfer section, and a fixing section. The conveyance section conveys a recording medium. An electrostatic latent image is formed on the photoreceptor. The development section forms a toner image on the photoreceptor. The transfer section transfers a toner image to a recording medium. The fixing section fixes a toner image transferred to a recording medium to the recording medium.

The image reading section 203 reads the image of an original document and generates image data. In the present embodiment, the image reading section 203 is a scanner.

The CPU 204 performs preset processing by executing a preset program stored in the memory 205 or the storage unit 206. In the present embodiment, an application specific integrated circuit (ASIC) is used as the CPU 204 in order to perform image processing as will be described later.

The memory 205 is a storage device including a ROM and a RAM. The memory 205 stores a program for controlling the master image forming apparatus 20A. The CPU 204 controls the entire mater image forming apparatus 20A by executing a program stored in the memory 205.

The storage unit 206 is a storage device, such as a hard disk or the like. The storage unit 206 stores print data received from the information processing devices 10. Further, the storage unit 206 stores a program for realizing an information obtaining section 207, an image processing section 208, an assignment control section 209, and an energy saving control section 210.

The information obtaining section 207 is a program for obtaining information from any devices connected to the communication circuit 30, and is executed by the CPU 204. The information that the information obtaining section 207 obtains may be usage information or the like of the image forming apparatuses 20.

The usage information indicates respective use states of the image forming apparatuses 20. The information obtaining section 207 obtains usage information from its own apparatus (master image forming apparatus 20A) and also obtains usage information from the slave image forming apparatuses 20B and 20C through the communication section 201 and the communication circuit 30. The use state includes a processing waiting state, a processing executing state, a power saving state, a trouble state, etc. The processing waiting state is a state in which an image forming apparatus 20 waits for a request for processing, such as printing, scanning, copying, etc. The processing executing state is a state in which an image forming apparatus 20 executes processing, such as printing, scanning, copying, etc. The energy saving state is a state in which the mode of an image forming apparatus 20 is changed to an energy saving mode. The trouble state is a state in which printing is not completed (e.g., occurrence of a jam, toner shortage, or paper shortage).

The image processing section 208 is a program for performing image processing on print data received from the information processing devices 10 and is executed by the CPU 204. Specifically, the image processing section 208 reads out print data from the storage unit 206, performs image processing on the print data, and writes to the storage unit 206 the processed print data subjected to image processing. The image processing is processing, such as image compression, image zooming, and the like.

The assignment control section 209 is a program for determining a print destination for processed print data subjected to image processing by the image processing section 208 and is executed by the CPU 204. Specifically, the assignment control section 209 selects (determines) a print destination for processed print data from the master image forming apparatus 20A and the slave image forming apparatuses 20B and 20C. When the slave image forming apparatus 20B or 20C is determined as a print destination, the assignment control section 209 transmits the processed print data to the slave image forming apparatus 20B or 20C determined as the print destination.

The energy saving control section 210 is a program for control for energy saving on the master image forming apparatus 20A and is executed by the CPU 204. Specifically, when a time period of waiting for a print request from each information processing device 10 reaches a preset time period, the energy saving control section 210 changes the mode of the master image forming apparatus 20A to the energy saving mode. It is noted that when the master image forming apparatus 20A is set in the energy saving mode, it is in a low energy consuming state in which a print request is receivable. Upon input of a print request to the master image forming apparatus 20A, the energy saving control section 210 returns the master image forming apparatus 20A to a state in which printing is executable.

The state detecting section 211 detects the use state of the master image forming apparatus 20A. The state detecting section 211 generates usage information indicative of the detected use state.

With reference to FIG. 2, the slave image forming apparatus 20B will be described below. It is noted that the slave image forming apparatus 20B has a similar configuration to the master image forming apparatus 20 except that the storage unit 216 includes none of the information obtaining section 207, the image processing section 208, and the assignment control section 209 unless otherwise specified. The slave image forming apparatus 20B is a printer. The slave image forming apparatus 20B includes a communication section 212, an image forming section 213, a CPU 214, a memory 215, a storage unit 216, and a state detecting section 218.

The communication section 212 is an interface to transmit/receive information to/from an external device through the communication circuit 30. In one example, the slave image forming apparatus 20B transmits information to the information processing devices 10A-10E, the master image forming apparatus 20A, and the slave image forming apparatus 20C through the communication section 212. Further, the slave image forming apparatus 20B receives information from the information processing devices 10A-10E, the master image forming apparatus 20A, and the slave image forming apparatus 20C through the communication section 212.

The image forming section 213 forms an image on a recording medium. Any known configuration is employable in the image forming section 213. Therefore, detailed description and illustration thereof are omitted.

The CPU 214 performs preset processing by executing a preset program stored in the memory 215 or the storage unit 216. As the CPU 214, a general-purpose CPU is used which has no function for image processing.

The memory 215 is a storage device including a ROM and a RAM. The memory 215 stores a program for controlling the slave image forming apparatus 20B. The CPU 214 controls the entire slave image forming apparatus 20B by executing a program stored in the memory 215.

The storage unit 216 is a storage device, such as a hard disk or the like. The storage unit 216 stores processed print data received from the master image forming apparatuses 20A. The storage unit 216 further stores a program for realizing an energy saving control section 217.

The energy saving control section 217 is a program for energy saving control on the slave image forming apparatus 20B and is executed by the CPU 214. Specifically, when a time period of waiting for a print request from the master image forming apparatus 20A reaches a preset time period, the energy saving control section 217 changes the mode of the slave image forming apparatus 20B to an energy saving mode. It is noted that when the slave image forming apparatus 20B is in the energy saving mode, it is in a low energy consumption state in which a print request is receivable. Upon input of a print request to the slave image forming apparatus 20B, the energy saving control section 217 returns the slave image forming apparatus 20B to a state in which printing is executable.

The state detecting section 218 detects the use state of the slave image forming apparatus 20B. The state detecting section 218 generates usage information indicative of the detected use state.

Figure 3:
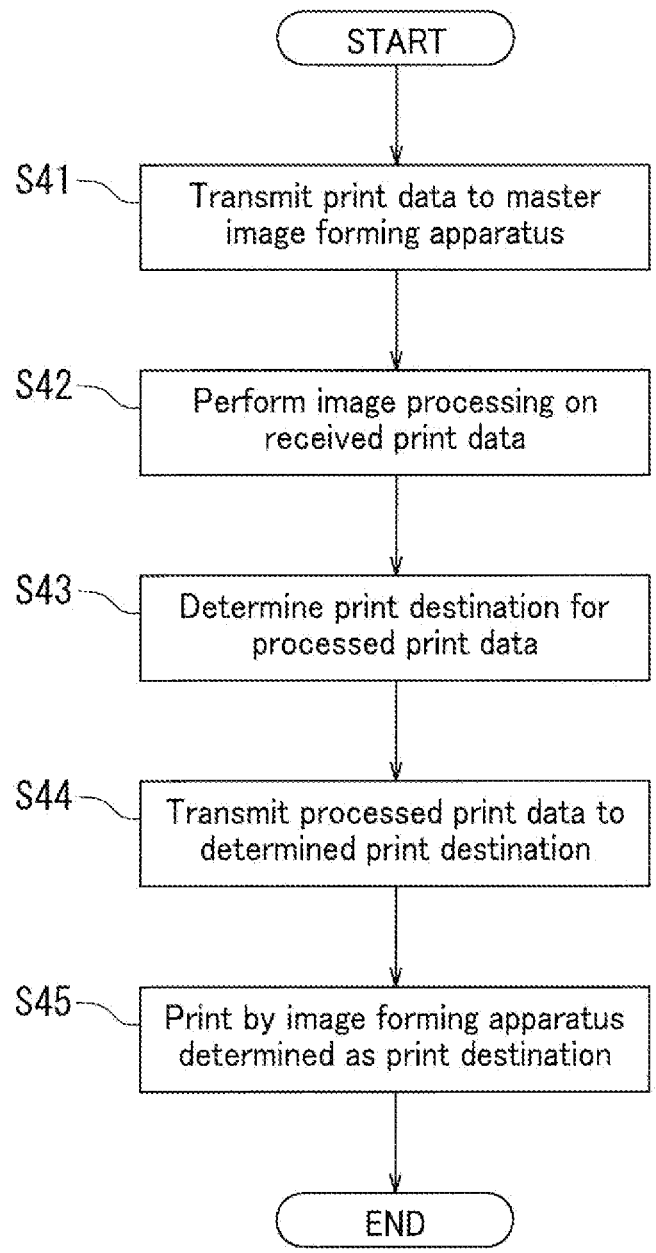
FIG. 3 is a flowchart depicting control for print request assignment by a master image forming apparatus in the image forming system according to one embodiment.

The configuration of the image forming system 1 according to the present embodiment has been described so far with reference to FIGS. 1 and 2. In the image forming system 1 of the present embodiment, when the user inputs a print request to one of the information processing devices 10, the information processing device 10 transmits print data to the master image forming apparatus 20A. The master image forming apparatus 20A performs information processing on the received print data in a non-shared manner and determines a print destination for the processed print data. Then, the master image forming apparatus 20A transmits the processed print data to the determined print destination for execution of printing. FIG. 3 is a flowchart depicting assignment control on a print request which is performed in the master image forming apparatus 20A of the image forming system 1 according to the present embodiment. The assignment control on a print request by the master image forming apparatus 20A will be described below with reference to FIGS. 1-3. The print request assignment control is executed through the following steps S41-S45.

Step S41: Print data is transmitted to the master image forming apparatus 20A. Specifically, the master image forming apparatus 20A receives print data transmitted from any of the information processing devices 10 in response to user's print request.

Step S42: The master image forming apparatus 20A performs image processing on the print data received in the step S41. Specifically, the image processing section 208 of the master image forming apparatus 20A performs on the print data image processing specified by the user through the information processing device 10.

Step S43: A print destination for the processed print data, which is subjected to image processing in the step S42, is determined Specifically, the assignment control section 209 of the master image forming apparatus 20A selects (determines) a print destination for the processed print data from the master image forming apparatus 20A and the slave image forming apparatuses 20B and 20C. The print destination is determined according to setting by the user. In one example, where the user sets the slave image forming apparatus 20C as a print destination through the printer driver 161 of one of the information processing devices 10, the assignment control section 209 of the master image forming apparatus 20A determines the slave image forming apparatus 20C as the print destination.

Step S44: The assignment control section 209 transmits the processed print data to the print destination determined in the step S42. In one example, the assignment control section 209 transmits the processed print data to the slave image forming apparatus 20C determined as the print destination.

Step S45: The image forming apparatus determined as the print destination prints the processed print data. In one example, the slave image forming apparatus 20C determined as a print destination prints the processed print data received in the step S44.

The assignment control of a print request by the master image forming apparatus 20A in the image forming system 1 according to the present embodiment has been described so far with reference to FIGS. 1-3. According to the image forming system 1 of the present embodiment, the master image forming apparatus 20A can perform the information processing on print data received from any of the information processing devices 10 in a non-shared manner. Accordingly, in the image forming system 1, any image forming apparatuses which may include no image processing section can be used as the slave image forming apparatuses 20B and 20C. Thus, cost of the image forming system 1 can be reduced.

It is noted that the image processing section 208 of the master image forming apparatus 20A in the image forming system 1 of the present embodiment is realized in a manner that the CPU 204 reads out and executes a program stored in the storage unit 206 in advance, which however, should not be taken to limit the present embodiment. The image processing section 208 may be realized by dedicated hardware. In one example, the master image forming apparatus 20A may include an ASIC for image processing and a general-purpose CPU for controlling the entire master image forming apparatus 20A.

The print destination for the processed print data is specified directly by the user in the image forming system 1 of the above embodiment, which however, should not be taken to limit the present disclosure, as will be described with reference to FIG. 4.

Figure 4:
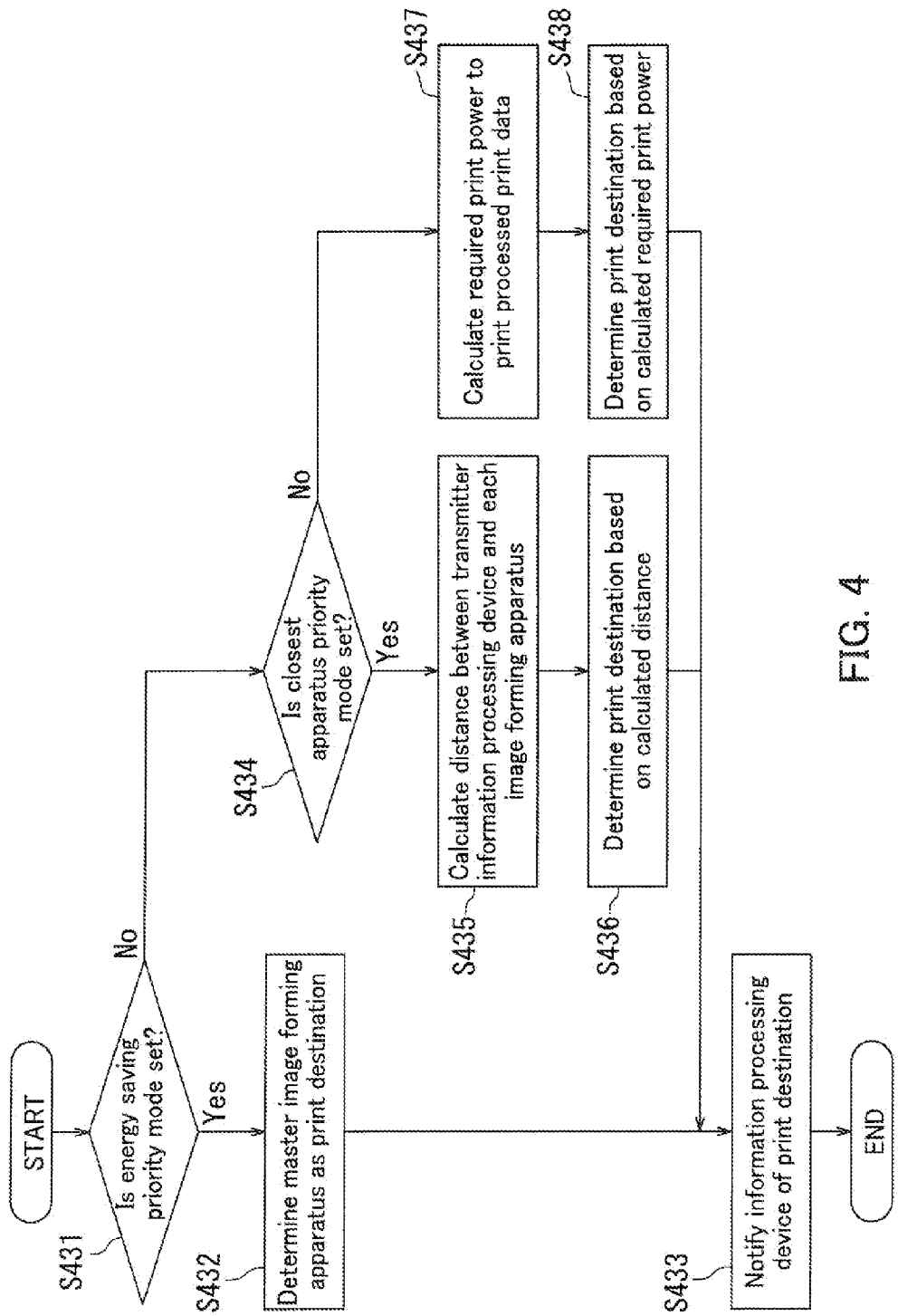
FIG. 4 is a flowchart depicting a process for determining a print destination for processed print data in the control for print request assignment by the master image forming apparatus in another embodiment.

FIG. 4 is a flowchart depicting another embodiment of the process (step S43) for determining a print destination of processed print data in the assignment control on a print request that the master image forming apparatus 20A performs. In the present embodiment, the print destination for the processed print data is determined on the basis of an output mode that the user sets. A process sequence of determination of a print destination for processed print data will be described below with reference to FIGS. 1-4. The process for determination of a print destination for processed print data is executed by the following steps S431-S438.

Step S431: Whether or not the output mode of processed print data is the energy saving priority mode is determined Specifically, the user sets the output mode of the print data by selecting one of the energy saving priority mode, the closest apparatus priority mode, and the output speed priority mode through one of the information processing devices 10. The assignment control section 209 determines whether or not the output mode of the processed print data, which is received from the information processing device 10 and is subjected to image processing, is the energy saving priority mode. When the assignment control section 209 determines the output mode as the energy saving priority mode, the routine proceeds to a step S432.

Step S432: The assignment control section 209 determines the master image forming apparatus 20A as a print destination for the processed print data. Then, the routine proceeds to a step S433.

Step S433: Through the communication circuit 30, the assignment control section 209 notifies the information processing device 10 that the print destination is the master image forming apparatus 20A. Then, the procedure is terminated.

By contrast, when the assignment control section 209 determines that the output mode is not the energy saving priority mode in the step S431, the routine proceeds to a step S434.

Step S434: Whether or not the output mode of the processed print data is the closest apparatus priority mode is determined. When the assignment control section 209 determines that the output mode is the closest apparatus priority mode, the routine proceeds to a step S435.

Step S435: The distance is calculated between the information processing device 10 that has transmitted the print data (hereinafter it may be referred to as a transmitter information processing device 10) and each image forming apparatus 20. In one example, where the transmitter information processing device 10 is the information processing device 10C, the assignment control section 209 calculates the distance between the information processing device 10C and the master image forming apparatus 20A, the distance between the information processing device 10C and the slave image forming apparatus 20B, and the distance between the information processing device 10C and the slave image forming apparatus 20C. In the present embodiment, distance calculation is carried out on the basis of map data indicative of the respective locations of the information processing devices 10A-10E, the master image forming apparatus 20A, and the slave image forming apparatuses 20B and 20C. The map data is stored in the memory 205 or the storage unit 206 of the master image forming apparatus 20A in advance. Then, the routine proceeds to a step S436.

Step S436: The print destination for the processed print data is determined on the basis of the distances calculated in the step S435. Specifically, the assignment control section 209 determines, as the print destination for the processed print data, an image forming apparatus from which the distance to the transmitter information processing device 10 is the smallest among the master image forming apparatus 20A and the slave image forming apparatuses 20B and 20C. In one example, where the slave image forming apparatus 20C is an image forming apparatus from which the distance to the transmitter information processing device 10 is the smallest, the assignment control section 209 determines the slave image forming apparatus 20C as the print destination for the processed print data. It is noted that where there are two or more image forming apparatuses from which the distance to the transmitter information processing device 10 is the smallest, any one of them is determined as the print destination. Then, the routine proceeds to a step S433.

Step S433: The assignment control section 209 notifies the transmitter information processing device 10 through the communication circuit 30 that the print destination is the slave image forming apparatus 20C. Then, the procedure is terminated.

By contrast, when the assignment control section 209 determines that the output mode is not the closest apparatus priority mode in the step S434, the routine proceeds to a step S437.

Step S437: Power required to print the processed print data (hereinafter it may be referred to as required print power) is calculated. Specifically, the assignment control section 209 calculates each required print power require in a plurality of combinations of the master image forming apparatus 20A and the slave image forming apparatuses 20B and 20C. In one example, upon input of a plurality of print requests from the information processing devices 10, the assignment control section 209 calculates a required print power a required where only the master image forming apparatus 20A executes the print requests, a required print power b required where only the slave image forming apparatus 20B executes the print requests, and a required print power c required where only the slave image forming apparatus 20C executes the print requests. The assignment control section 209 further calculates a required print power d required where the master image forming apparatus 20A and the slave image forming apparatus 20B execute the print requests, a required print power e required where the master image forming apparatus 20A and the slave image forming apparatus 20C execute the print request, and a required print power f required where the slave image forming apparatus 20B and the slave image forming apparatus 20C execute the print requests. The assignment control section 209 still further calculates a required print power g required where the master image forming apparatus 20A and the slave image forming apparatuses 20B and 20C execute the print requests. Then, the routine proceeds to a step S438.

Step S438: The print destination for the processed print data is determined on the basis of the required print powers calculated in the step S437. Specifically, the assignment control section 209 determines, as the print destination for the processed print data, a combination of which the required print power is the closest to and not exceeding a preset threshold value among the plurality of combinations of the master image forming apparatus 20A and the slave image forming apparatuses 20B and 20C. In one example, suppose that the preset threshold value is set at 2100 W. Suppose further that the required print powers a, b, c, d, e, f, and g calculated in the step S437 are 1500 W, 1200 W, 1000 W, 2000 W, 1800 W, 1500 W, and 2400 W, respectively. In this case, the required print power which is the closest to and not exceeding the preset threshold value is 2000 W. The assignment control section 209 determines as the print destination for the processed print data the combination in which the required print power is 2000 W (i.e., a combination of the master image forming apparatus 20A and the slave image forming apparatus 20B). It is noted that where there are two or more combinations in which the required print power is the closest to and not exceeding the preset threshold value, any one of them is determined as the print destination. Then, the routine proceeds to a step S433.

Step S433: The assignment control section 209 notifies the information processing devices 10 through the communication circuit 30 that the master image forming apparatus 20A and the slave image forming apparatus 20B are the print destinations. Then, the procedure is terminated.

The process sequence of determining a print destination for processed print data in the image forming system 1 according to the present embodiment has been described so far with reference to FIGS. 1-4. According to the present embodiment, the print destination for the processed print data can be determined on the basis of the output mode that the user sets. When the user sets the energy saving priority mode as the output mode, all the print data transmitted from the transmitter information processing device(s) 10 is printed by the master image forming apparatus 20A. Accordingly, each mode of the slave image forming apparatuses 20B and 20C is changed to the energy saving mode under the control by the energy saving control section 210. Thus, energy consumption by the image forming system 1 can be reduced.

By contrast, when the user sets the closest apparatus priority mode as the output mode, the print data is printed by an image forming apparatus located the closest to the user. Accordingly, time required for the user to go and pick up the printed matter can be shortened. It is noted that an image forming apparatus from which the distance to the transmitter information processing device 10 is the smallest is determined as the print destination for the processed print data in the present embodiment, which however, should not be taken to limit the present embodiment. In one example, a threshold value may be set in advance, and the user may be notified of any image forming apparatuses from which the distance to the transmitter information processing device 10 is equal to or smaller than the threshold value as options. The user can select an image forming apparatus as a print destination from the options.

Moreover, the distance calculation is done on the basis of the map data in the present embodiment, which however, should not be taken to limit the present disclosure. The distance calculation can be done on the basis of strength of wireless communication, for example. Specifically, the communication circuit 30 in the image forming system 1 may be a wireless communication circuit that performs wireless communication. In one example, the information processing devices 10 may be connected to the image forming apparatuses 20 through Wi-Fi Direct (registered trademark). The distances between the respective information processing devices 10 and the respective image forming apparatuses 20 can be estimated according to the strength of the radio waves of the wireless communication. The master image forming apparatus 20A determines the print destination for the processed print data on the basis of the distances estimated according to the strength of the radio waves of the wireless communication. Accordingly, even if any of the locations of the information processing devices 10 and the image forming apparatuses 20 are changed, the distances between the respective information processing devices 10 and the respective image forming apparatuses 20 can be calculated appropriately.

By contrast, when the user sets the print speed priority mode as the output mode, the print data is printed in the shortest time period within the range where the required print power does not exceed the threshold value. Accordingly, the wait time period until printing is completed can be shortened. It is noted that the combination of the image forming apparatuses of which required print power is the closest to and not exceeding the preset threshold value is determined as the print destination in the present embodiment, which however, should not be taken to limit the present disclosure. In one example, the user may be notified of combinations of the image forming apparatuses of which required print powers are not exceeding a preset threshold value as options. This can allow the user to select an image forming apparatus as a print destination from the options.

Yet further, in the image forming system 1 according to the present disclosure, where a trouble occurs in printing in an image forming apparatus determined as the print destination, the maser image forming apparatus 20A can assign a non-printed portion of the processed print data. Description will be made about assignment of a non-printed portion of the processed print data in the case where a trouble occurs in the master image forming apparatus 20A and in the case where a trouble occurs in the slave image forming apparatus 20B or 20C.

Upon occurrence of a trouble in the master image forming apparatus 20A in printing, the state detecting section 211 transmits trouble information to the assignment control section 209. When receiving the trouble information, the assignment control section 209 determines a print destination of a non-printed portion of the processed print data from the slave image forming apparatus 20B and the slave image forming apparatus 20C. In one example, the assignment control section 209 determines the print destination of the non-printed portion of the processed print data from the slave image forming apparatuses 20B and 20C according to a preset rule (e.g., a device with the least required print power is prioritized; a device that requires the shortest required printing time period is prioritized; or the closest device is prioritized). Further, the information processing device(s) 10 may be notified of the slave image forming apparatuses 20B and 20C as options by the assignment control section 209, thereby allowing the user to specify the print destination. It is noted that where the image forming system 1 includes an additional master image forming apparatus, when the master image forming apparatus 20A is disabled to communicate with the slave image forming apparatuses 20B and 20C upon occurrence of a trouble, the assignment control section 209 transmits a non-printed portion of the processed print data to another master image forming apparatus, for example. Then, the other master image forming apparatus prints or re-assign the non-printed portion of the processed print data.

Upon occurrence of a trouble in the slave image forming apparatus 20B or 20C in printing, the state detecting section 218 of its own transmits trouble information and a non-printed portion of the processed print data to the assignment control section 209 of the master image forming apparatus 20A. When receiving the trouble information, the assignment control section 209 determines a print destination of the non-printed portion of the processed print data from the image forming apparatuses 20 in which no trouble occurs. The print destination determination method is the same as that in the case where a trouble occurs in the master image forming apparatus 20A. It is noted that the assignment control section 209 may notify the information processing device(s) 10 of a newly determined print destination.

In each of the above embodiments, the master image forming apparatus 20A is a multifunction peripheral, while the slave image forming apparatuses 20B and 20C are printers having the similar configuration, which however, should not be taken to limit the present disclosure. The master image forming apparatus 20A may be another image forming apparatus having an image processing function (e.g., a printer or a copier). The slave image forming apparatuses 20B and 20C may be copiers or have different configurations. In addition, the information processing devices 10A-10E are personal computers having the similar configuration, which however, should not be taken to limit the present disclosure. The information processing devices 10A-10E may be terminal devices, such as mobile phones or have different configurations.

What is claimed is:

1. An image forming apparatus connected to an information processing device and at least one external image forming apparatus through a communication circuit, comprising:

a communication section configured to transmit/receive information to/from the information processing device and the at least one external image forming apparatus through the communication circuit;

an image forming section configured to form an image on a recording medium;

an image processing section configured to perform image processing on print data received from the information processing device; and an assignment control section configured to determine a print destination for processed print data subjected to image processing by the image processing section from the image forming apparatus of its own and the at least one external image forming apparatus, wherein the assignment control section determines the print destination for the processed print data on the basis of an output mode set for the processed print data in the information processing device, the output mode includes a print speed priority mode, the assignment control section calculates respective required print powers required to print the processed print data for a plurality of combinations of the image forming apparatus of its own and the at least one external image forming apparatus, and the assignment control section determines, as the print destination for the processed print data, a combination of which the required print power is the closest to and not exceeding a preset threshold value among the plurality of combinations thereof.

2. An image forming apparatus according to claim 1, wherein the output mode includes a closest apparatus priority mode, and where the closest apparatus priority mode is set as the output mode for the processed print data, the assignment control section determines as the print destination for the processed print data an image forming apparatus from which a distance to the information processing device which transmits the processed print data is the smallest out of the image forming apparatus of its own and the at least one external image forming apparatus.

3. An image forming apparatus according to claim 2, wherein the assignment control section calculates the distance on the basis of map data indicative of respective locations of the image forming apparatus of its own, the at least one external image forming apparatus, and the information processing device.

4. An image forming apparatus according to claim 2, wherein the communication circuit is a wireless communication circuit configured to perform wireless communication, and the assignment control section calculates the distance on the basis of strength of the wireless communication.

5. An image forming apparatus according to claim 1, wherein the output mode includes an energy saving priority mode, and where the energy saving priority mode is set as the output mode for the processed print data, the assignment control section determines the image forming apparatus of its own as the print destination.

6. An image forming apparatus according to claim 1, wherein when the at least one external image forming apparatus transmits to the image forming apparatus of its own trouble information indicative of a state in which printing of the processed print data is not completed, the assignment control section determines the print destination for a non-printed portion of the processed print data.

7. An image forming apparatus according to claim 1, further comprising:
a state detecting section configured to detect a state in which printing of the processed print data is not completed in the image forming apparatus of its own to generate trouble information and to transmit the trouble information to the assignment control section,
wherein upon receipt of the trouble information from the state detecting section, the assignment control section transmits a non-printed portion of the processed print data to the at least one external image forming apparatus.

8. An image forming apparatus according to claim 1, wherein
the communication circuit is a wireless communication circuit configured to perform wireless communication.

* * * * *